(12) United States Patent
Werner

(10) Patent No.: US 12,157,215 B2
(45) Date of Patent: Dec. 3, 2024

(54) HAND-HELD POWER TOOL COMPRISING A LOCKING DEVICE

(71) Applicant: Robert Bosch GmbH, Stuttgart (DE)

(72) Inventor: Immanuel Werner, Bad Urach (DE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 17/698,633

(22) Filed: Mar. 18, 2022

(65) Prior Publication Data

US 2022/0305633 A1 Sep. 29, 2022

(30) Foreign Application Priority Data

Mar. 26, 2021 (DE) .................. 10 2021 203 064.5

(51) Int. Cl.
*B25D 17/08* (2006.01)
*B23B 31/107* (2006.01)

(52) U.S. Cl.
CPC .......... *B25D 17/08* (2013.01); *B23B 31/1071* (2013.01); *B25D 2217/0042* (2013.01); *B25D 2250/231* (2013.01); *Y10T 279/17076* (2015.01)

(58) Field of Classification Search
CPC ............ B23D 17/08; B23D 2217/0042; B23D 2250/231; B23B 31/1071; Y10T 279/17076
See application file for complete search history.

(56) References Cited

U.S. PATENT DOCUMENTS

| 4,502,824 | A | * | 3/1985 | Dohse | ...................... | B23Q 3/12 |
| | | | | | | 173/13 |
| 5,199,833 | A | * | 4/1993 | Fehrle | .................. | B25D 17/088 |
| | | | | | | 408/239 R |
| 5,340,245 | A | * | 8/1994 | Bloechle | ............... | B23B 31/005 |
| | | | | | | 279/19.3 |
| 5,601,388 | A | * | 2/1997 | Lauterwald | .......... | B25D 17/088 |
| | | | | | | 408/239 R |
| 5,669,730 | A | * | 9/1997 | Bidaux | .................. | B25D 17/08 |
| | | | | | | 403/321 |

(Continued)

FOREIGN PATENT DOCUMENTS

DE 35 16 541 A1 11/1986
DE 3516541 C2 * 3/1994 ............. B25D 17/06

(Continued)

*Primary Examiner* — Eric A. Gates
(74) *Attorney, Agent, or Firm* — Maginot, Moore & Beck LLP

(57) ABSTRACT

A hand-held power tool includes a tool receiver with a tubular tool holder and an assigned locking device. The assigned locking device includes a locking element configured to lock an insert tool in the tubular tool holder, a pressure sleeve that is spring-loaded via an assigned spring element, and a stop sleeve, the spring-loaded pressure sleeve configured to press the locking element in a locking position against the stop sleeve. The tubular tool holder includes at least one recess in which the locking element in the locking position is located, at least portionally. The stop sleeve has, on its inner circumference, at least one contact surface that is matched to an outer contour of the locking element such that a first surface contact between the at least one contact surface and the locking element is established in the locking position.

9 Claims, 4 Drawing Sheets

(56) References Cited

U.S. PATENT DOCUMENTS

| | | | | |
|---|---|---|---|---|
| 6,241,026 B1 * | 6/2001 | Wache | | B23Q 3/12 173/132 |
| 6,536,780 B2 * | 3/2003 | Baumann | | B25D 17/088 279/22 |
| 6,543,789 B2 * | 4/2003 | Frenzel | | B25D 17/088 279/74 |
| 6,659,473 B2 * | 12/2003 | Below | | B25D 17/088 279/82 |
| 6,669,206 B2 * | 12/2003 | Hanke | | B25D 17/06 279/74 |
| 8,172,235 B2 * | 5/2012 | Furusawa | | B25D 17/088 279/22 |
| 8,210,545 B2 * | 7/2012 | Hild | | B23B 31/1071 279/19.6 |
| 8,672,331 B2 * | 3/2014 | Braun | | B25D 17/24 279/22 |
| 10,286,536 B2 * | 5/2019 | Mohanasundaram | | B25D 17/088 |
| 2002/0050365 A1 * | 5/2002 | Bongers-Ambrosius | | B25D 11/04 173/128 |
| 2003/0089509 A1 * | 5/2003 | Wanek | | B25D 17/088 173/48 |
| 2005/0224243 A1 * | 10/2005 | Baumann | | B25D 17/088 173/128 |
| 2005/0232715 A1 * | 10/2005 | Baumann | | B25D 17/088 408/226 |
| 2013/0206436 A1 | 8/2013 | Thorson et al. | | |
| 2015/0197002 A1 * | 7/2015 | Didier | | B25D 17/088 173/109 |
| 2022/0118594 A1 * | 4/2022 | Werner | | B23B 31/1071 |
| 2022/0388137 A1 * | 12/2022 | Mandel | | B25D 11/005 |

FOREIGN PATENT DOCUMENTS

| | | | | |
|---|---|---|---|---|
| DE | 195 21 993 A1 | 1/1997 | | |
| DE | 197 08 176 A1 | 9/1998 | | |
| DE | 102006057934 A1 * | 6/2008 | | B23B 31/11 |
| EP | 0456003 A1 * | 11/1991 | | |
| EP | 1293305 A1 * | 3/2003 | | B25D 17/088 |
| EP | 2 894 009 A1 | 7/2015 | | |
| EP | 2910338 A1 * | 8/2015 | | B25D 16/00 |

* cited by examiner

HAND-HELD POWER TOOL COMPRISING A LOCKING DEVICE

This application claims priority under 35 U.S.C. § 119 to application no. DE 10 2021 203 064.5, filed on Mar. 26, 2021 in Germany, the disclosure of which is incorporated herein by reference in its entirety.

BACKGROUND

Known from EP 2 894 009 A1 is a hand-held power tool that has a locking device for locking an insert tool in a tubular tool holder. The locking device has locking elements that, in an assigned locking position, are pressed by a spring-loaded pressure sleeve against a contact surface of a stop sleeve. The locking elements are embodied, by way of example, as pawls that, in the assigned locking position, are located at least portionally in assigned recesses of the tubular tool holder.

SUMMARY

The present disclosure relates to a hand-held power tool, comprising a tool receiver that has a tubular tool holder in which an insert tool can be locked by an assigned locking device via at least one locking element, the locking device having a pressure sleeve that is spring-loaded via an assigned spring element, and a stop sleeve, the spring-loaded pressure sleeve pressing the at least one locking element in a locking position against the stop sleeve, and the tubular tool holder having at least one recess in which the at least one locking element in the locking position is located, at least portionally.

The disclosure relates to a hand-held power tool, comprising a tool receiver that has a tubular tool holder in which an insert tool can be locked by an assigned locking device via at least one locking element, the locking device having a pressure sleeve that is spring-loaded via an assigned spring element, and a stop sleeve, the spring-loaded pressure sleeve pressing the at least one locking element in a locking position against the stop sleeve. The tubular tool holder has at least one recess in which the at least one locking element in the locking position is located, at least portionally. The stop sleeve has, on its inner circumference, at least one contact surface that is matched to an outer contour of the at least one locking element in order to enable a surface contact between the at least one contact surface and the at least one locking element in the locking position.

As a result of the contact surface of the stop sleeve being matched to the outer contour of the at least one locking element, and a surface contact being realized between the contact surface and the at least one locking element in the locking position, the capacity of the stop sleeve to resist the occurrence of wear can be significantly increased. Consequently, a corresponding service life of the stop sleeve, and thus of the tool receiver as a whole, can be advantageously prolonged due to a resulting reduction in wear. Moreover, the increased capacity of the stop sleeve to resist the occurrence of wear also allows the tool receiver to be used in comparatively powerful hand-held power tools, the power of which can exceed that of conventional hand-held power tools.

According to one embodiment, the spring-loaded pressure sleeve has at least one receiver in which the at least one locking element is received, a pressure surface being assigned to the at least one receiver for the purpose of applying force to the at least one locking element in the locking position, and the pressure surface being matched to the outer contour of the at least one locking element in order to enable a surface contact between the pressure surface and the at least one locking element in the locking position.

As a result of the pressure surface of the spring-loaded pressure sleeve being matched to the outer contour of the at least one locking element, and a surface contact being realized between the pressure surface and the at least one locking element in the locking position, the capacity of the spring-loaded pressure sleeve to resist the occurrence of wear can be significantly increased. Consequently, again a corresponding service life of the spring-loaded pressure sleeve, and thus of the tool receiver as a whole, can be advantageously prolonged due to a resulting reduction in wear. Moreover, the increased capacity of the spring-loaded pressure sleeve to resist the occurrence of wear likewise allows the tool receiver to be used in comparatively powerful hand-held power tools, the power of which can exceed that of conventional hand-held power tools.

Preferably, the at least one locking element comprises a locking sphere, and the pressure surface and/or the at least one contact surface are/is at least portionally spherical.

Thus, a safe and reliable locking element can be provided, allowing simple and uncomplicated design of the pressure and/or contact surface.

Preferably, the at least one receiver of the spring-loaded pressure sleeve is designed to enable the at least one locking element to be received with play.

As a result of the at least one locking element being received with play in the receiver of the spring-loaded pressure sleeve, the at least one locking element can move in an unhindered manner in the receiver, within predefined tolerances. Thus, the forces required for displacement of the spring-loaded pressure sleeve can advantageously be reduced.

According to one embodiment, the at least one locking element comprises a locking sphere, and the at least one contact surface is at least portionally spherical.

Thus, irrespective of a corresponding design of the spring-loaded pressure sleeve, at least the stop sleeve can be realized so as to reduce wear.

According to one embodiment, the spring-loaded pressure sleeve is displaceable, against a spring force of the assigned spring element, in the longitudinal direction of the tubular tool holder in order to displace the at least one locking element from the locking position to the unlocking position.

As a result, advantageously, only a displacement of the spring-loaded pressure sleeve is required to displace the at least one locking element from the locking position to the unlocking position. This can advantageously be effected by moving the spring-loaded pressure sleeve by means of an assigned locking sleeve.

Preferably, a locking sleeve is provided, which is displaceable in the longitudinal direction of the tubular tool holder for the purpose of displacing the spring-loaded pressure sleeve against the spring force of the assigned spring element.

A simple and uncomplicated unlocking operation is thus achievable by displacement of the locking sleeve.

Preferably, the locking sleeve has a load portion that, when the locking sleeve is displaced in the longitudinal direction against the spring-loaded pressure sleeve, displaces the spring-loaded pressure sleeve against the spring force of the assigned spring element.

An unlocking operation is thus easily executed by displacement of the locking sleeve.

According to one embodiment, the locking sleeve has a groove-shaped grip region.

The groove-shaped design of the grip region advantageously allows the locking sleeve to be of a comparatively slim design, so that unintentional actuation of the locking sleeve during operation can be effectively prevented. This also makes it possible to avoid uncontrolled unlocking, during operation, of an insert tool locked in the tool receiver of the hand-held power tool.

According to one embodiment, the hand-held power tool is realized in the manner of a hammer drill or chipping hammer, the tubular tool holder comprising a hammer tube.

A suitable hand-held power tool can thus be provided in a simple, uncomplicated manner.

BRIEF DESCRIPTION OF THE DRAWINGS

The disclosure is explained more fully in the following description on the basis of exemplary embodiments represented in the drawings, in which.

DETAILED DESCRIPTION

In the figures, elements that have the same or a comparable function are denoted by identical references and described in greater detail only once.

Figure 1:
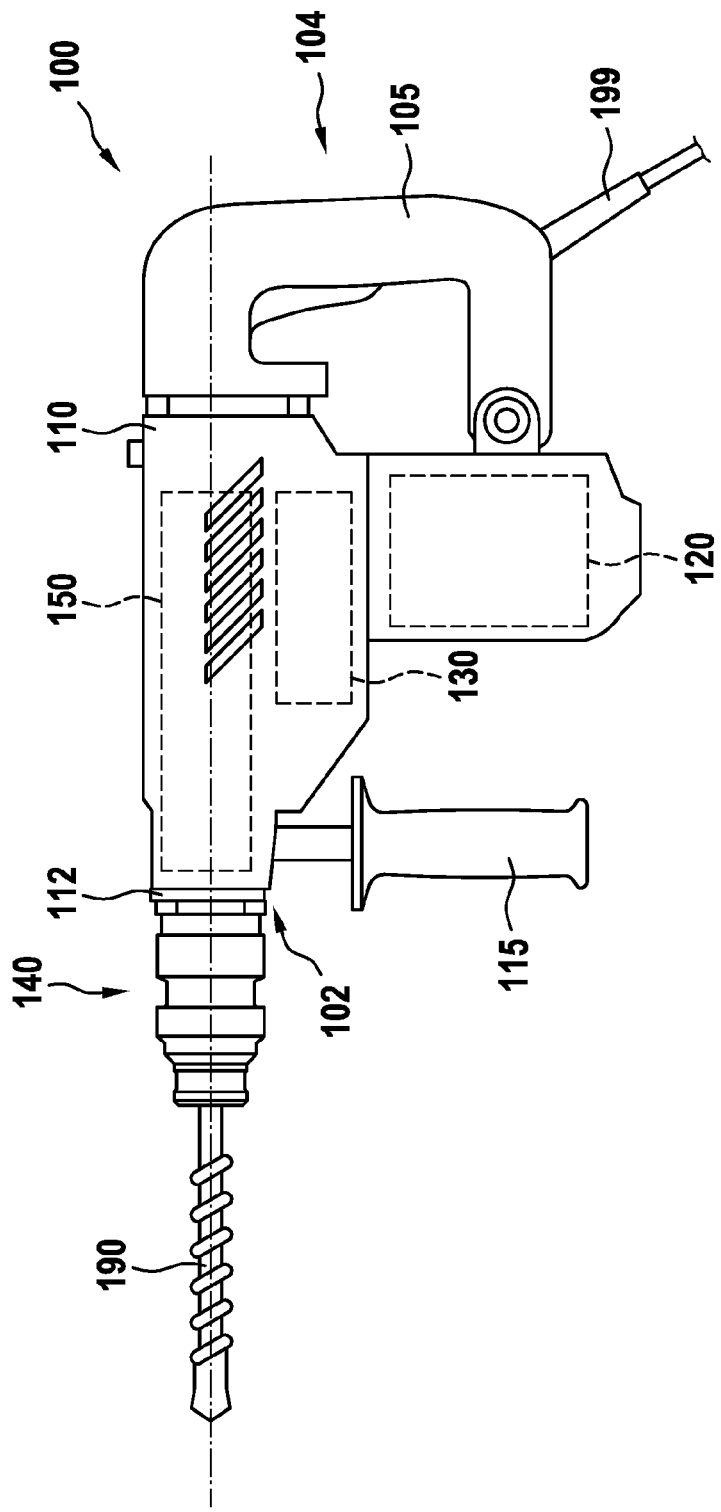
FIG. 1 a side view of a hand-held power tool having a tool receiver according to the disclosure, FIG. 2 a longitudinal section through the tool receiver from FIG. 1, in the locking state, FIG. 3 a perspective view of a stop sleeve of the tool receiver from FIG. 2, FIG. 4 a sectional view of the stop sleeve from FIG. 3, FIG. 5 a perspective view of a pressure sleeve of the tool receiver from FIG. 2, and FIG. 6 a sectional view of the pressure sleeve from FIG. 5.

FIG. 1 shows an exemplary hand-held power tool 100 having a housing 110 located in which, illustratively, there is a drive unit 120 for driving a tool receiver 140. The tool receiver 140 is preferably designed to receive an insert tool 190. Preferably, the tool receiver 140 is a 22 mm HEX tool receiver, but may also be realized as an SDSmax or SDSplus tool receiver, or as any other suitable tool receiver.

Optionally, there is a transmission 130 assigned to the drive unit 120. However, the hand-held power tool 100 may also be realized without the transmission 130.

Furthermore, the hand-held power tool 100 preferably has a percussion mechanism 150 for generating percussion pulses when the hand-held power tool 100 is in a percussive operating mode. The generation of percussion pulses by means of the percussion mechanism 150 is sufficiently known to persons skilled in the art. A suitable percussion mechanism with which the percussion mechanism 150 may be realized is also sufficiently known to persons skilled in the art, such that, in the interest of simple and concise description, a detailed description of the percussion mechanism 150, and of the functionality of the percussion mechanism 150, is not provided here.

Illustratively, the housing 110, on its side 104 that faces away from the tool receiver 140, has a handle 105, and on its side 102 that faces toward the tool receiver 140 has an optional ancillary handle 115. Preferably, the housing 110, on its side 102, is provided with an end flange 112.

In addition, the hand-held power tool 100 can be operated, for example, by connection to a mains power supply, i.e. can be connected to a mains power supply via a power cable 199. However, the hand-held power tool 100 may instead also be operated without a cable, e.g. via a battery pack.

Preferably, the hand-held power tool 100 is realized in the manner of a hammer drill or chipping hammer. Such a hand-held power tool 100 is sufficiently known from the prior art, and therefore, in the interest of conciseness, a detailed description is not provided here.

Figure 2:
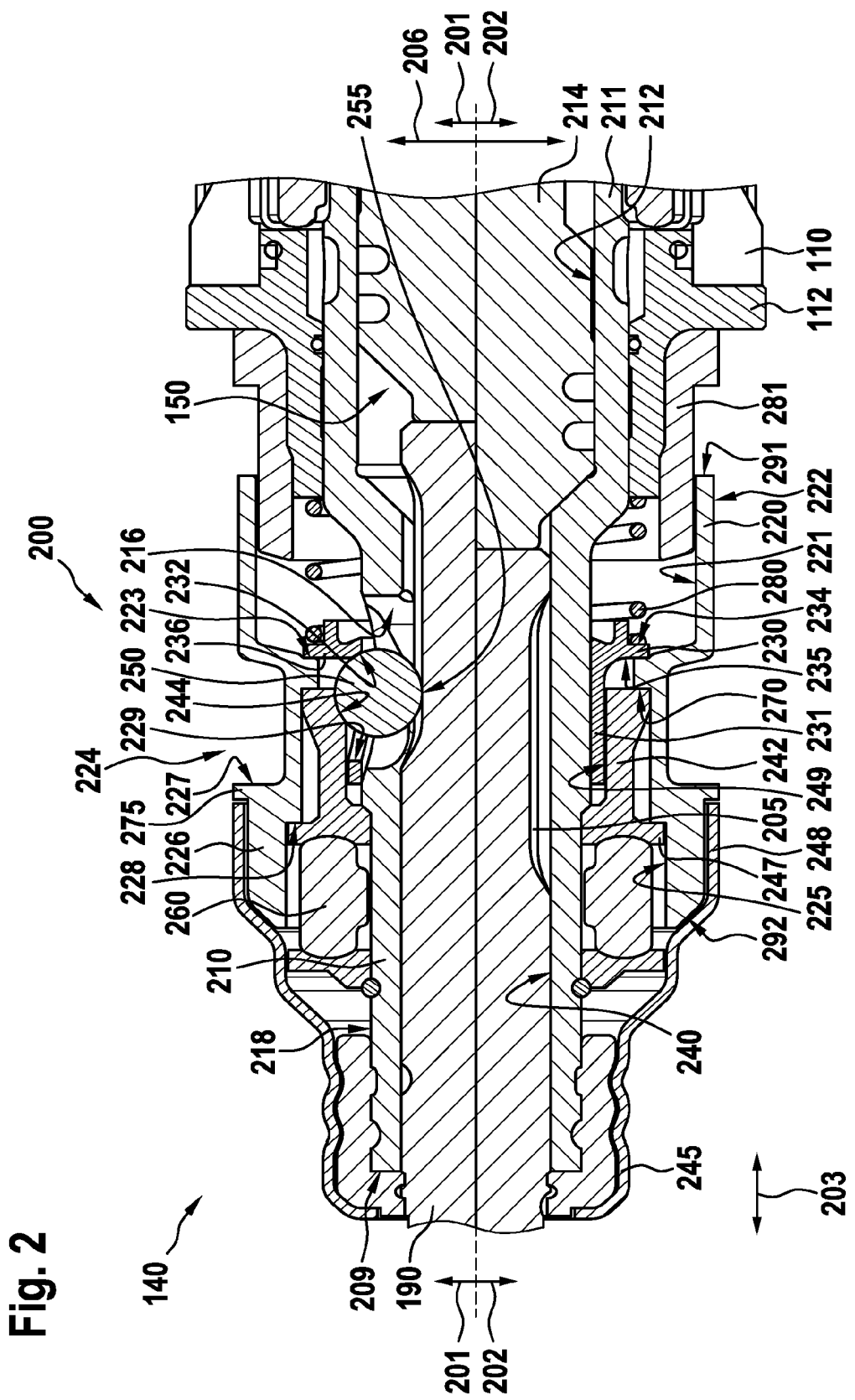

FIG. 2 shows the tool receiver 140 from FIG. 1, as well as a detail of the housing 110 of the hand-held power tool 100 from FIG. 1 provided with the end flange 112. The tool receiver 140 preferably has a locking device 200, by means of which the exemplary insert tool 190 from FIG. 1 is locked in the tool receiver 140. Exemplarily, the locking device 200 is shown in a locking state. The tool receiver 140, and thus also the locking device 200, illustratively has a longitudinal extent 203 that defines an axial direction, or longitudinal direction, and has a transverse extent 206 that defines a radial direction.

The tool receiver 140 preferably has a tubular tool holder 210, which has at least one recess 216. Preferably, the tool holder 210 has a hammer tube 211, and is preferably realized as a single piece with the latter.

Illustratively, the tool holder 210 realizes an internal receiver 240 for receiving the insert tool 190. The hammer tube 211 exemplarily realizes an internal receiver 212, in which there is preferably located at least one striker 214 assigned to the percussion mechanism 150 from FIG. 1.

In an upper half of the picture, as viewed in the direction of arrows 201, the tool receiver 140 is shown exemplarily before a percussion pulse is transmitted from the striker 214 to the insert tool 190. In the lower half of the image, as viewed in the direction of arrows 202, the tool receiver 140 is exemplarily shown in percussion mode during the transmission of a percussion pulse from the striker 214 to the insert tool 190.

The insert tool 190 illustratively has a locking portion 205, which faces toward the striker 214 and via which the insert tool 190 is locked in the tool holder 210, and thus in the tool receiver 140, by the locking device 200. Preferably, assigned to the locking device 200 there is at least one locking element 250, located in the at least one recess 216 of the tool holder 210, for locking the insert tool 190.

Preferably, two or three locking elements 250 are provided, each locking element engaging respectively in an assigned recess of the tool holder 210. However, more than three locking elements 250 may be provided. Illustratively, the locking element 250 is realized as a locking sphere. However, the locking element 250 may also be realized in any other way, for example as a roller or pawl, or may be of any other shape having a spherical portion.

It is to be noted at this point that the exemplary realization represented in FIG. 2 is based on the use of three locking balls. These are preferably each arranged at an angular distance of 120° relative to each other. Therefore, in FIG. 2, there is also no locking sphere in the lower half of the image, as viewed in the direction of arrows 202, since the lower half of the image is arranged with an offset of 180° relative to the upper half of the image, as viewed in the direction of arrows 201, in which a locking sphere of the locking device 200 is shown.

Illustratively, the locking device 200 has a pressure sleeve 230 that spring-loaded via an assigned spring element 280, has and a stop sleeve 242. The stop sleeve 242 preferably has at least one contact surface 244 on its inner circumference 249. The at least one contact surface 244 is preferably matched to an outer contour 255 of the at least one locking element 250 in order to enable a surface contact between the at least one contact surface 244 and the at least one locking element 250 in the locking position. Preferably, there is a respective contact surface assigned to each locking element.

The spring-loaded pressure sleeve 230 preferably has a load collar 236 against which the assigned spring element 280 bears in order to press the spring-loaded pressure sleeve 230 into a locking position, as shown. Illustratively, the load collar 236 has an abutment edge 234 against which the assigned spring element 280 bears.

It is to be noted that, in the context of the present disclosure, the term "sleeve" is to be understood to include any round, preferably elongate, internally hollow object into which something can be inserted. Accordingly, in the context of the present disclosure, the term "sleeve" also includes a wide ring, or a plurality of interconnected webs extending, for example, on a cylindrical surface, the circumferential end of which is annular, etc.

Preferably, the spring-loaded pressure sleeve 230 presses the at least one locking element 250 in the locking position against the at least one contact surface 244 of the stop sleeve 242. For this purpose, the spring-loaded pressure sleeve 230 preferably has at least one pressure surface 232 for applying force to the at least one locking element 250 in the locking position. Preferably, there is a respective pressure surface assigned to each locking element. The pressure surface 232 in this case preferably faces toward the locking element 250. Preferably, the spring-loaded pressure sleeve 230 is displaceable, against a spring force of the assigned spring element 280, in the longitudinal direction 203 of the tool holder 210 in order to displace the at least one locking element 250 from the locking position to the unlocking position.

Illustratively, the spring-loaded pressure sleeve 230 additionally has at least one receiver 229, or preferably respectively one receiver per locking element. The at least one pressure surface 232 is preferably assigned to at least one receiver 229 for the purpose of applying force to the at least one locking element 250 in the locking position. Preferably, the pressure surface 232 is also matched to the outer contour 255 of the at least one locking element 250 in order to enable a surface contact between the pressure surface 232 and the at least one locking element 250 in the locking position.

The at least one receiver 229 is exemplarily realized in a sleeve-shaped body 231 of the spring-loaded pressure sleeve 230. The sleeve-shaped body 231 is preferably guided in an axially displaceable manner on an outer circumference 218 of the tool holder 210.

The at least one locking element 250 is preferably received with play in the at least one receiver 229, i.e. in such a manner that the at least one locking element 250 can move in an unhindered manner in the receiver 229, within predefined tolerances. The at least one locking element 250 preferably engages via the recess 216 of the tool holder 210, at least in regions, in the locking portion 205 of the insert tool 190, and thus locks the latter in the tool holder 210, or in the tool receiver 140.

In addition, the locking device 200 preferably has a locking sleeve 220, which is displaceable in the longitudinal direction 203 of the tool holder 210 in order to displace the spring-loaded pressure sleeve 230 from its locking position to an unlocking position. This displacement is effected against the spring force of the spring element 280. Alternatively, the locking sleeve 220 and the spring-loaded pressure sleeve 230 may also be embodied as a single piece, or at least the sleeve-shaped body 231 of the spring-loaded pressure sleeve 230 may be realized as an integral part of the locking sleeve 220.

Preferably, the locking sleeve 220 is provided with a groove-shaped grip region 224. This groove-shaped grip region 224 illustratively realizes an annular grip cavity 227. In this case, the annular recessed grip cavity 227, as viewed in the longitudinal direction 203, preferably has a circular cross-section but may alternatively also have any other cross-section, e.g. a polygonal cross-section.

The locking sleeve 220 may comprise a first material, and the spring-loaded pressure sleeve 230 may comprise a second material. The first material is preferably plastic, in particular a dimensionally stable plastic, e.g. hard plastic. Furthermore, the plastic may be realized as a fiber-reinforced plastic, in particular fiber-reinforced and/or carbon-fiber-reinforced plastic, e.g. polyamide with glass fiber. The second material is preferably a metallic material, preferably steel. In particular, the second material is preferably a hardenable material, e.g. metal, sintered material.

Illustratively, the locking sleeve 220 has a first axial end 291 that faces toward the end flange 112, and has an opposite, second axial end 292. In the region of the first axial end 291, the locking sleeve 220 preferably has a guide portion 222. In the region of the second axial end 292, the locking sleeve 220 preferably has an engagement portion 226. The groove-shaped grip region 224 is preferably located, in the longitudinal direction 203 of the tool holder 210, between the engagement portion 226 and the guide portion 222.

The guide portion 222 preferably realizes an internal receiver 221, in which the load collar 236 of the spring-loaded pressure sleeve 230 and the spring element 280 are located, at least partially. In this case, the guide portion 222 preferably has an end wall 223 that faces toward the groove-shaped grip region 224 and that realizes a load portion against which the spring element 280 illustratively spring-loads the load collar 236 in the locking position of the at least one locking element 250. Exemplarily, an abutment edge 235 of the load collar 236 is spring-loaded against the end wall 223, or the load portion 223.

Illustratively, the guide portion 222 serves to guide the locking sleeve 220 on a guide sleeve 281. The latter is preferably attached to the end flange 112 of the housing 110.

The engagement portion 226 preferably realizes an internal receiver 225, in which a damping element 260 is preferably located when the locking device 200 is in the locking state, as shown in FIG. 2. Illustratively, the damping element 260 is annular and located on the outer circumference 218 of the tool holder 210. In addition, the damping element 260 preferably bears, in the longitudinal direction 203 of the tool holder 210, against the stop sleeve 242 against which there also bears a first inner collar 228 of the locking sleeve 220. Illustratively, the first inner collar 228 bears against an outer collar 247 of the stop sleeve 242. A second inner collar 270 of the locking sleeve 220, exemplarily formed by the load portion 223 of the locking sleeve 220, also bears against the stop sleeve 242.

Illustratively, there is an outer collar 275 assigned to the engagement portion 226. The outer collar 275 preferably forms a transition from the engagement portion 226 to the groove-shaped grip region 224.

Preferably, when the locking device 200 is in the locking state, the engagement portion 226 engages in a protective cap 245. The protective cap 245 is preferably located at a free end 209 of the tool holder 210.

Illustratively, the protective cap 245 is provided with a receiving portion 248. Received in the receiving portion 248, for example, is the damping element 260, as well as the stop sleeve 242, at least portionally. Preferably, when the locking device 200 is in the locking state, at least the engagement portion 226 of the locking sleeve 220 engages in the receiving portion 248.

For the purpose of locking the insert tool 190 in the tool receiver 140, the insert tool 190 is pushed into the tool holder 210 in the direction of the striker 214. The insert tool 190 in this case presses against the at least one locking element 250 located in the recess 216 and displaces it against the spring-loaded pressure sleeve 230 and thereupon with the latter in such a manner that the at least one locking element 250 is pushed out of the recess 216 in the direction of the end flange 112 to such an extent that an end of the insert tool 190 that faces toward the striker 214 is pushed past the at least one locking element 250. The spring-loaded pressure sleeve 230 thereupon, by the spring force of the spring element 280, presses the at least one locking element 250 back into the recess 216, where the at least one locking element 250 engages, at least in regions, in the locking portion 205 of the insert tool 190, and thus locks the insert tool 190 in the tool holder 210.

When the locking device 200 is in the locking state, the spring-loaded pressure sleeve 230, by the spring force of the spring element 280, presses the at least one locking element 250 against the at least one contact surface 244 of the stop sleeve 242, and into the recess 216 of the tool holder 210, for the purpose of locking the insert tool 190. The spring-loaded pressure sleeve 230 in this case also presses the locking sleeve 220 against the stop sleeve 242, such that the outer collar 275 of the locking sleeve 220 preferably bears in a flush manner against the receiving portion 248 of the protective cap 245.

For the purpose of unlocking the locking device 200, the locking sleeve 220 is preferably displaced, in the longitudinal direction 203 of the tool receiver 140, against the spring-loaded pressure sleeve 230, and thus with the latter against the spring force of the spring element 280 in the direction of the guide sleeve 281. The spring-loaded pressure sleeve 230 in this case takes the at least one locking element 250 with it, so that the latter is pushed out of the recess 216 of the tool holder 210 at least to such an extent that it releases the locking portion 205 of the insert tool 190, and thus releases the insert tool 190.

Figure 3:
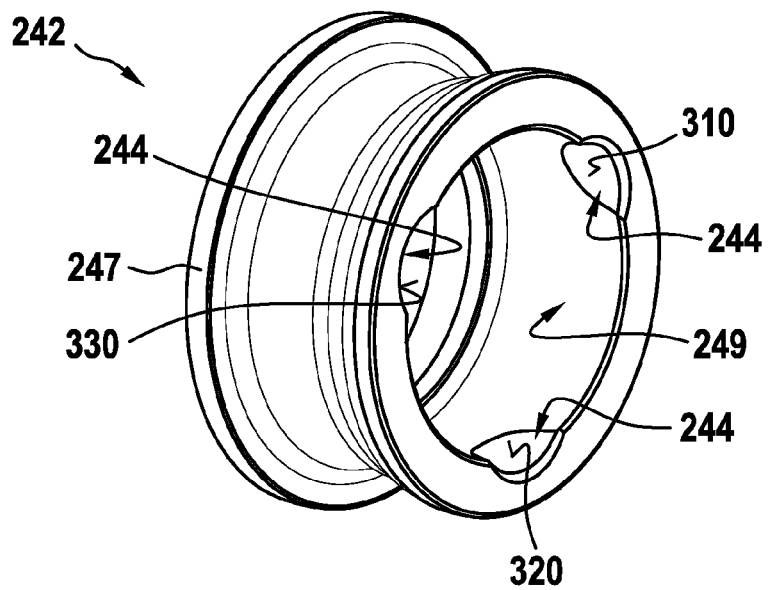

FIG. 3 shows the stop sleeve 242 of the locking device 200 of the tool receiver 140 from FIG. 2. The stop sleeve 242 illustratively comprises the outer collar 247, as well as three contact surfaces 244 on its inner circumference 249. For elucidation, the three contact surfaces 244 are denoted separately by the references 310, 320, 330.

As described in the case of FIG. 2, preferably, but not necessarily, three locking elements are used, to which the three contact surfaces 310, 320, 330 are assigned. These are preferably each matched to the outer contour of the locking elements, in order to enable a surface contact between each of the contact surfaces 310, 320, 330 and each assigned locking element in the locking position.

Preferably, as described in the case of FIG. 2, the three locking elements are realized as locking spheres. Accordingly, the three contact surfaces 310, 320, 330 are preferably at least portionally spherical.

Figure 4:
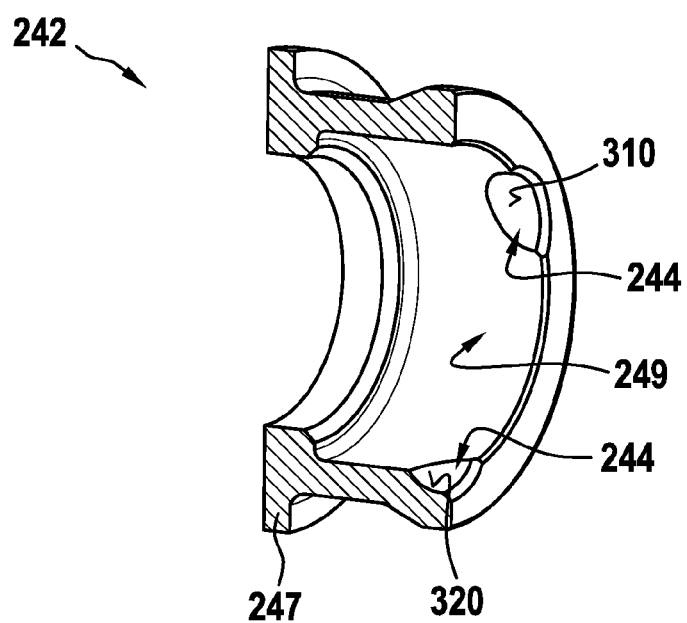

FIG. 4 shows the stop sleeve 242 from FIG. 3 with the contact surfaces 244, of which only the contact surface 310 and a portion of the contact surface 320 are visible here. FIG. 4 illustrates the at least portionally spherical design of the contact surfaces 244.

Figure 5:
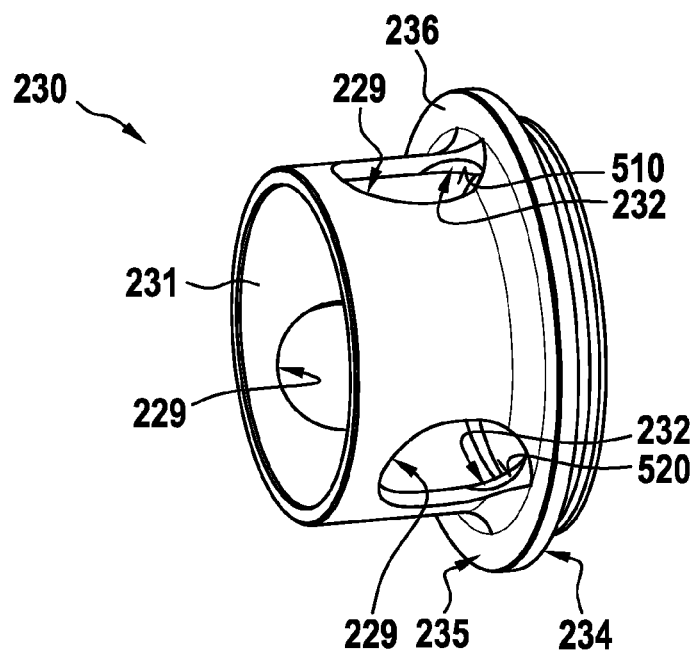

FIG. 5 shows the spring-loaded pressure sleeve 230 of the locking device 200 of the tool receiver 140 from FIG. 2. The spring-loaded pressure sleeve 230 illustratively comprises the load collar 236, as wells three receivers 229, each of which has an assigned pressure surface 232. Accordingly, there are three pressure surfaces 232, of which, however, only two are visible in FIG. 5 and for elucidation are denoted separately by the references 510, 520.

As described in the case of FIG. 2, preferably, but not necessarily, three locking elements are used, to which the three pressure surfaces 232 are assigned. These are preferably each matched to the outer contour of the locking elements, in order to enable a surface contact between each of the pressure surfaces 232 and each assigned locking element in the locking position.

Preferably, as described in the case of FIG. 2, the three locking elements are realized as locking spheres. Accordingly, the three pressure surfaces 232 are preferably at least portionally spherical.

Figure 6:
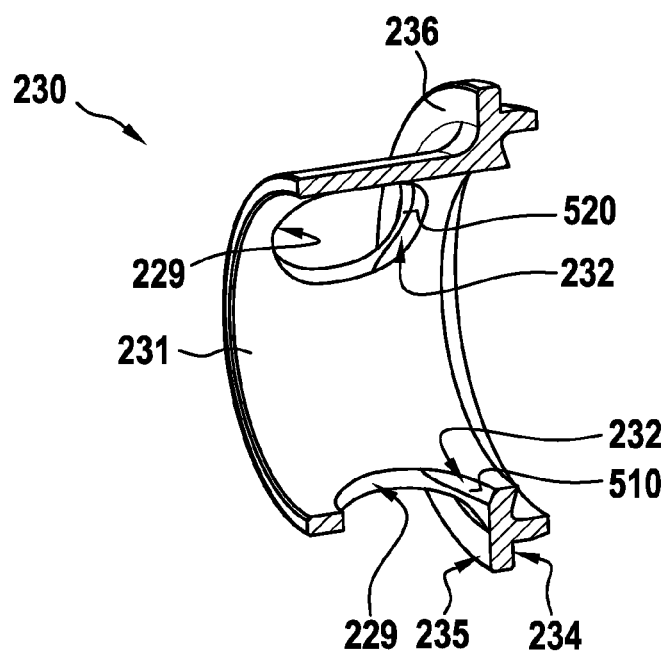

FIG. 6 shows the spring-loaded pressure sleeve 230 from FIG. 5 with the pressure surfaces 232, of which only the pressure surface 520 and a portion of the pressure surface 510 are visible here. FIG. 6 illustrates the at least portionally spherical design of the pressure surfaces 232.

It is also to be noted that FIG. 3 to FIG. 6 describe an at least portionally spherical design of the contact surfaces of the stop sleeve 242 from FIG. 2, or of the pressure surfaces of the spring-loaded pressure sleeve 230 from FIG. 2. However, both features may be realized independently of each other in the locking device 200 of the tool receiver 140 from FIG. 2. Accordingly, the locking device 200 from FIG. 2 may be realized with the stop sleeve 242 from FIG. 3 and FIG. 4 and/or with the spring-loaded pressure sleeve 230 from FIG. 5 and FIG. 6.

What is claimed is:

1. A hand-held power tool, comprising:
a tool receiver comprising:
a tubular tool holder; and
an assigned locking device including (i) at least one locking sphere configured to lock an insert tool in the tubular tool holder, a pressure sleeve that is spring-loaded via an assigned spring element, and a stop sleeve,
wherein
the tubular tool holder includes at least one recess in which the at least one locking sphere is at least partially located in a locking position of the locking device,
in the locking position, the pressure sleeve is configured to press the at least one locking sphere against the stop sleeve,
the stop sleeve has, on its an inner circumference with at least one spherical contact surface that is complementary to an outer contour of the at least one locking sphere such that a first surface contact between the at least one spherical contact surface and the at least one locking sphere is established in the locking position.

2. The hand-held power tool according to claim 1, wherein:
the spring-loaded pressure sleeve has at least one receiver in which the at least one locking sphere is received;
a pressure surface is assigned to the at least one receiver and configured to apply a force to the at least one locking sphere in the locking position; and
the pressure surface is matched to the outer contour of the at least one locking sphere such that a second surface contact between the pressure surface and the at least one locking sphere is established in the locking position.

3. The hand-held power tool according to claim 2, wherein the pressure surface is at least partially spherical.

4. The hand-held power tool according to claim 3, wherein the at least one receiver of the spring-loaded pressure sleeve is designed to enable the at least one locking sphere to be received with play.

5. The hand-held power tool according to claim 1, wherein the spring-loaded pressure sleeve is displaceable, against a spring force of the assigned spring element, in the longitudinal direction of the tubular tool holder so as to displace the at least one locking sphere from the locking position to an unlocking position.

6. The hand-held power tool according to claim 5, wherein a locking sleeve is provided, which is displaceable in the longitudinal direction of the tubular tool holder so as to displace the spring-loaded pressure sleeve against the spring force of the assigned spring element.

7. The hand-held power tool according to claim 6, wherein the locking sleeve has a load portion that, when the locking sleeve is displaced in the longitudinal direction against the spring-loaded pressure sleeve, displaces the spring-loaded pressure sleeve against the spring force of the assigned spring element.

8. The hand-held power tool according to claim 6, wherein the locking sleeve has a groove-shaped grip region.

9. The hand-held power tool according to claim 1, wherein:
 the hand-held power tool is one of a hammer drill and chipping hammer, and
 the tubular tool holder comprises a hammer tube.

* * * * *

UNITED STATES PATENT AND TRADEMARK OFFICE
CERTIFICATE OF CORRECTION

Page 1 of 1

PATENT NO. : 12,157,215 B2
APPLICATION NO. : 17/698633
DATED : December 3, 2024
INVENTOR(S) : Werner It is certified that error appears in the above-identified patent and that said Letters Patent is hereby corrected as shown below:

In the Claims

In Claim 1, at Column 8, Line 48: "the stop sleeve has, on its an inner circumference" should read --the stop sleeve has an inner circumference--.

Signed and Sealed this
First Day of July, 2025

Coke Morgan Stewart
*Acting Director of the United States Patent and Trademark Office*